Patented Mar. 4, 1930

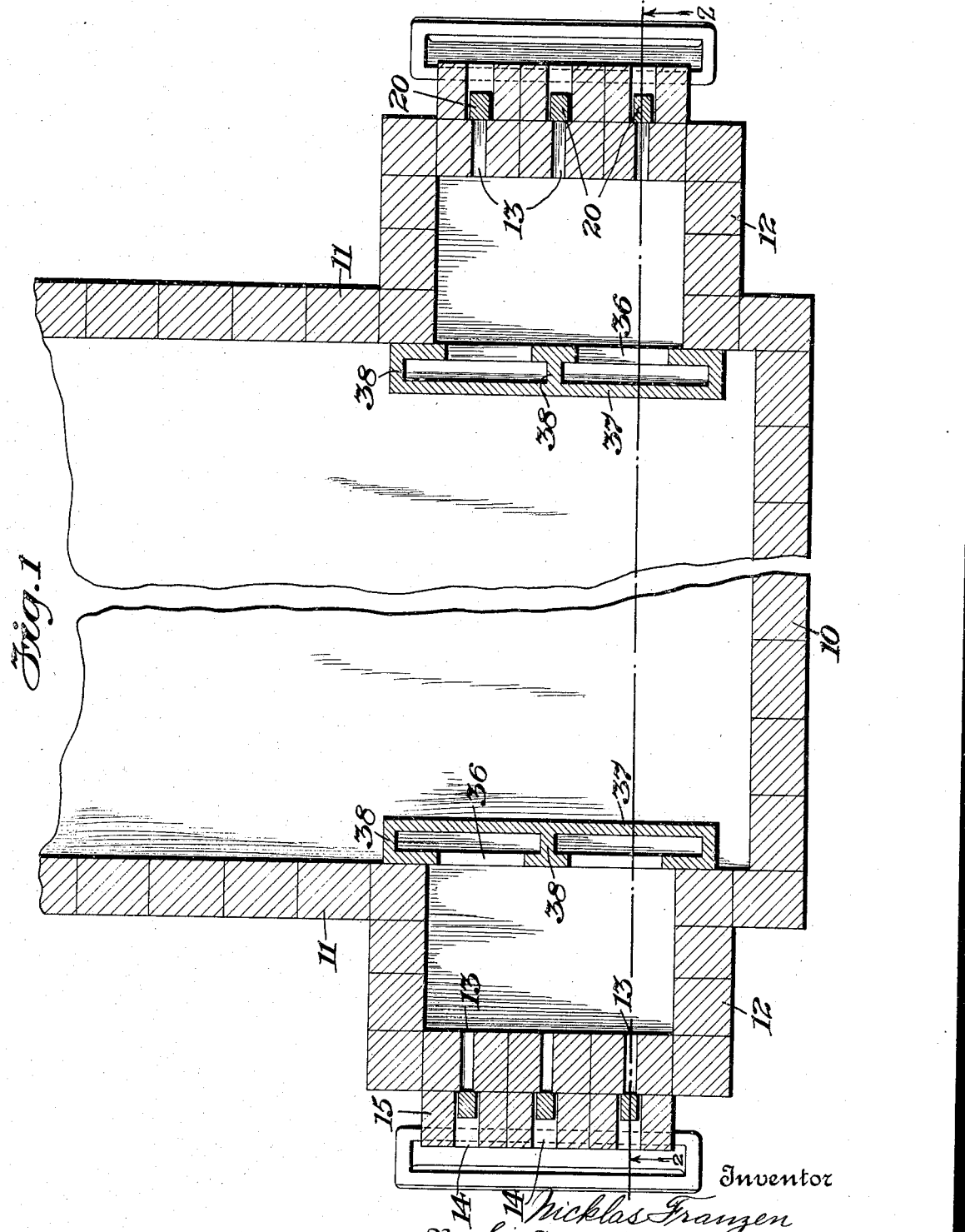

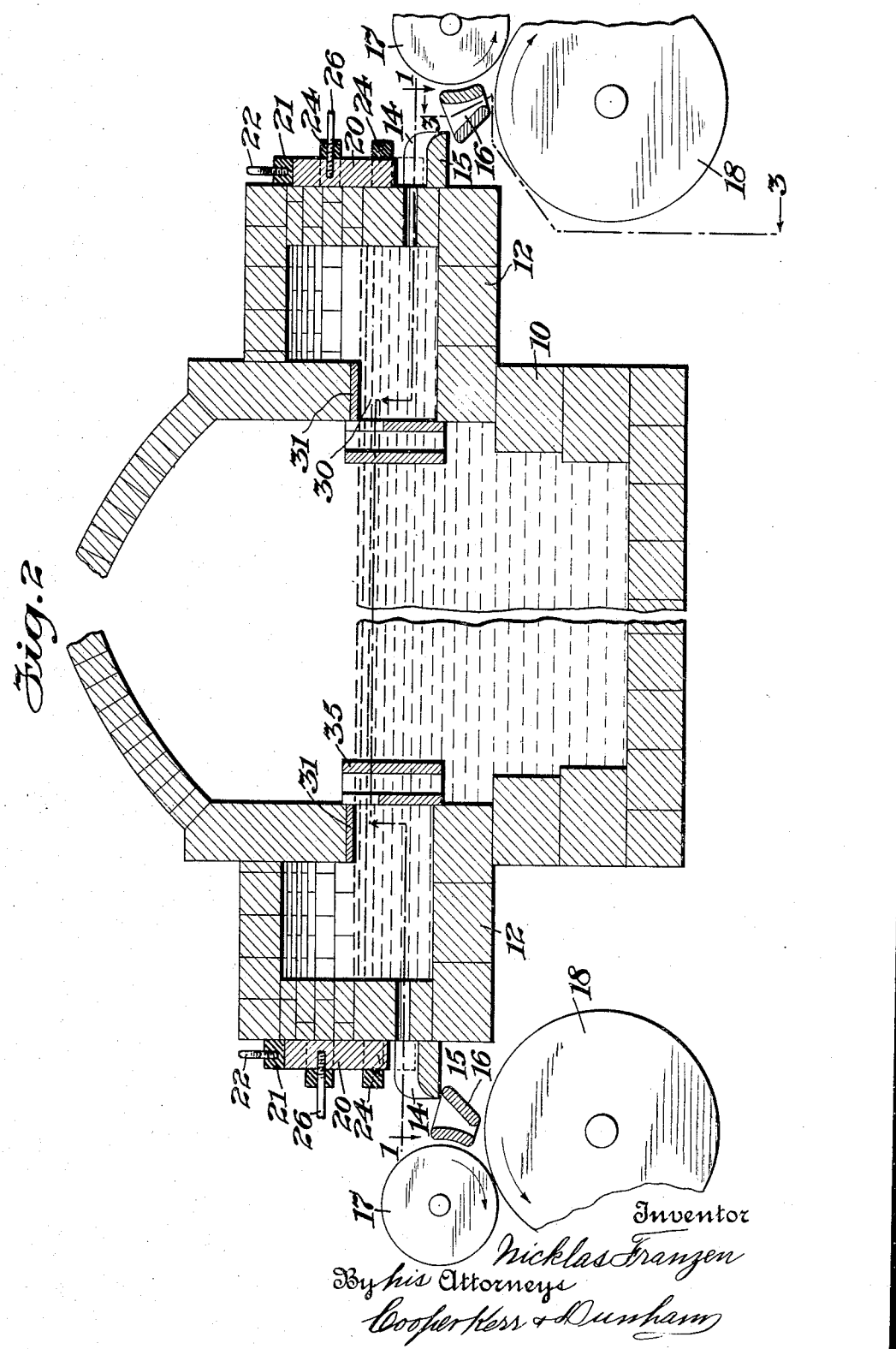

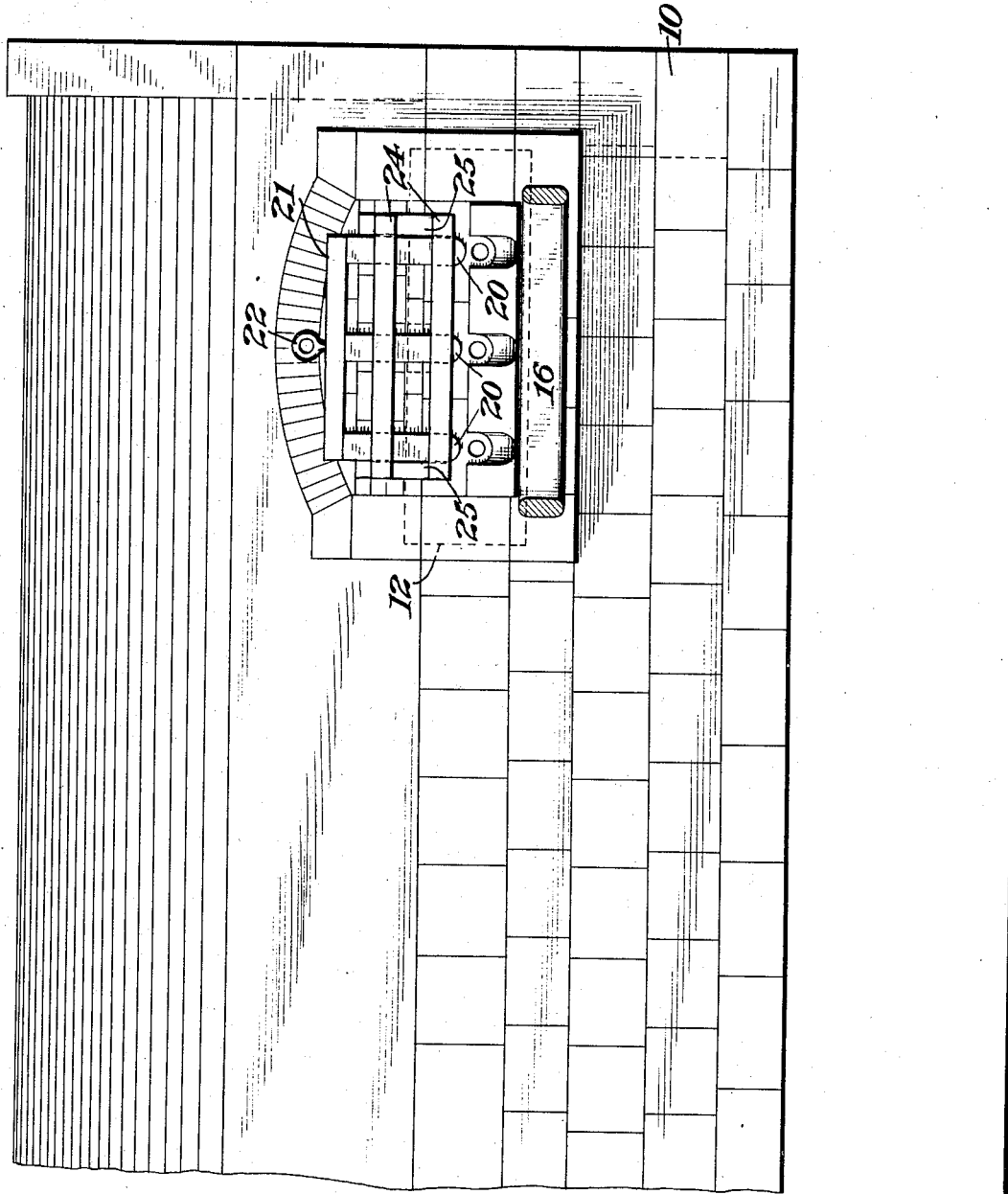

1,749,332

UNITED STATES PATENT OFFICE

NICKLAS FRANZEN, OF LONG BEACH, CALIFORNIA, ASSIGNOR TO MISSISSIPPI GLASS COMPANY, A CORPORATION OF NEW YORK

APPARATUS FOR FORMING SHEET GLASS

Application filed April 7, 1926. Serial No. 100,214.

My present invention relates to apparatus for the melting of glass and for the pouring of molten glass and the formation of sheets therefrom. It relates particularly to means in such glass melting and forming apparatus for preventing the flow of slag with the glass as it is admitted from the furnace, for directing the fl w of molten glass in a stream approximating in cross section that of the sheet to be formed therefrom, and for finally forming the poured glass in the desired dimensions.

In the melting and pouring of glass for the manufacture of sheet glass heretofore, difficulties have been encountered in various steps which include, the separation of slag from the molten glass, pouring the glass from the melting furnace without the use of apparatus for preventing clogging of ports which become clogged and which waste considerable quantities of glass, pouring the glass without excluding therefrom air which accumulates as bubbles in the formed sheet, and leading the molten glass to the forming mechanism such as rolls in a manner to allow the rapid production of glass sheet of uniform quality throughout.

It is therefore an object of my invention to provide in a glass melting furnace means which without interfering with the normal operation of the furnace excludes slag during the admission of molten glass from the furnace.

It is a further object of my invention to provide a method and means for admitting molten glass from a melting furnace without the clogging of ports and without the accumulation of air in the molten glass as it is fed to sheet forming means. This method and means is applicable also to the making of other than sheets from molten glass.

It is also an object of my invention to provide means for feeding molten glass to sheet forming means whereby the glass is so fed with a cross section approximating the sheet to be formed.

Other objects of my invention will appear from the drawings and specifications.

In the drawings Fig. 1 is a plan view in section of the apparatus of my invention, taken along the line 1—1 of Fig. 2 looking in the direction of the arrows, Fig. 2 is a sectional view in elevation of the apparatus of Fig. 1 taken along the line 2—2 of Fig. 1 and looking in the direction of the arrows, and Fig. 3 is a vertical elevation view of the apparatus of Figs. 1 and 2 taken along the line 3—3 of Fig. 2.

In the drawings the glass melting furnace 10 has formed in the wall thereof in both of the sides 11, 11 and near one end thereof the boxes 12, 12 which extend above and below the normal level of molten glass in the furnace. Through the outer wall of each of said boxes 12 at point below the normal level of the molten glass are formed the openings 13, 13 in a horizontal row. On the outer wall of the boxes and below each of said openings 13, 13 are found the pouring channels 14, 14 in the refractory blocks 15, 15 which empty into the funnels 16, 16 which are of a length substantially equal to the width of sheet glass to be formed by the rolls 17, 18 between which they discharge. The closure members 20, 20 arranged vertically one for each of said openings 13 and in gangs, those of each gang being connected by the members 21, 21 with means such as the eye bolts 22, 22 for moving said closure members into and out of closing position. The guide members 24, 24 serve to hold said closure members against the wall of their respective boxes while the guide members 25, 25 serve to hold said closure members against angular movement on the walls and also to space said guide members 24, 24 from the wall. The pins 26, 26 in registering openings in one of the guide members 24 and a respective closure member 20 serve to hold said closure members open when desired.

The boxes 12, 12 connect on their inner sides with the furnace 10 through the respective openings 30, 30 in the walls 11, 11 of said furnace, said openings being lined at their upper edges with the vitreous plates 31, 31 of material resistant to the glass and its slag when submerged therein or when exposed to the atmosphere of the furnace.

Across the openings 30, 30 are positioned respective hollow baffles 35, 35 each comprising a wall 36 which extends to the limits of the openings 30 but which terminates in part below the upper limit thereof, a wall 37 spaced inwardly from wall 36 and extending over the projected area of opening 30 and above the maximum level of glass and slag in the furnace, and the walls 38, 38 extending between walls 36 and 37 between the upper end limits thereof whereby said baffles prevent the flow of slag to said boxes 12, 12 and to outports 13, 13 at any level at which glass will flow to said boxes below said maximum level. In furnaces where there is a liability of the level of the glass rising above the upper limits of walls 36, 37 and 38 I provide the baffle with an upper closure thereover to prevent flow of glass through the baffle over its upper limits.

In the use and operation of the apparatus of my invention, the molten glass in the furnace 10 is poured therefrom through the chambers 12 and the ports 13 therein through the spouts 15. The baffles 35, having walls 37, 38 extending above the normal levels of the molten glass in the furnace and having openings above walls 36 extending upwardly from a point below such levels, prevent the flow of slag, which floats on the molten surface of the glass, from the main chambers 10 into said feed chambers 12. The spouts 15 convey the molten glass in the individual troughs 14, 14 formed therein which communicate with respective ports 13 and permit of the feeding of molten glass into the longitudinal funnel 16 without the accumulation of air intermingled therewith. The lower and narrower opening of the bottom of said funnel restricts the flow of molten glass therefrom and causes it to pass therefrom in a solid or continuous stream from one end thereof to the other and of cross sectional dimensions approximating that of the space between the rolls 17 and 18 whereby as the glass is forced therebetween to form the sheet, the resulting glass sheet is of a substantially uniform constitution free from any air bubbles. The flow of molten glass through the said ports 13 is controlled by the closure members 20 which are movable by means of the eye bolt 22 fixed to the closure connecting bar 21, the bars 24, 25 serving to guide the closures in such movement. The pin 26, engageable in registering openings in said bars 24 and in one of said closure members 20 when it is in open position, serves to hold each of the closures in such position when it is so desired.

What I claim is:

1. In a glass melting and sheet forming apparatus, in combination, a melting furnace, outports in the walls of said furnace below the normal levels of molten glass therein, a baffle in the path of flow of glass from the furnace to said ports having an open end trough extending from a point on the side away from said port and below the normal levels of molten glass therein, an opening on the port side of the said baffle at a point within said levels of molten glass in said furnace, a plurality of troughs communicating with said ports, a longitudinal funnel for receiving molten glass from the said plurality of troughs and having its lower and outgoing opening of dimensions approximating the cross sectional dimensions of the sheet glass to be made.

2. In a glass melting and sheet forming apparatus, in combination, a melting furnace, outports in the walls of said furnace below the normal levels of molten glass therein, a baffle in the path of flow of glass from the furnace to said ports having an open end trough extending from a point on the side away from said port and below the normal levels of molten glass therein, an opening on the port side of the said baffle at a point within said levels of molten glass in said furnace, a plurality of troughs communicating with said ports, a longitudinal funnel for receiving molten glass from the said plurality of troughs and having its lower and outgoing opening of dimensions approximating the cross sectional dimensions of the sheet glass to be made and forming means for receiving the stream of molten glass from the said funnel.

In testimony whereof I hereto affix my signature.

NICKLAS FRANZEN.